United States Patent [19]

Mannschke

[11] 4,432,601
[45] Feb. 21, 1984

[54] APPARATUS AND METHOD FOR COUPLING AND DECOUPLING OF OPTICAL FIBER WAVEGUIDES

[75] Inventor: Lothar Mannschke, Eckental, Fed. Rep. of Germany

[73] Assignee: Te Ka De Felten & Guilleaume Fernmeldeanlagen GmbH, Nuremberg, Fed. Rep. of Germany

[21] Appl. No.: 235,135

[22] Filed: Feb. 17, 1981

[30] Foreign Application Priority Data

Feb. 23, 1980 [DE] Fed. Rep. of Germany ....... 3006895

[51] Int. Cl.³ .............................................. G02B 7/26
[52] U.S. Cl. .............................. 350/96.19; 350/96.20; 248/181
[58] Field of Search .................. 248/181, 178; 269/75, 269/76; 350/96.15, 96.19, 96.20, 173

[56] References Cited

FOREIGN PATENT DOCUMENTS

| 54-5753 | 1/1979 | Japan | 350/96.20 |
| 54-38146 | 3/1979 | Japan | 350/96.15 |
| 55-35354 | 3/1980 | Japan | 350/96.19 |
| 55-84903 | 6/1980 | Japan | 350/96.20 |
| 55-142302 | 11/1980 | Japan | 350/96.20 |

OTHER PUBLICATIONS

Crow et al., *IBM Tech. Disc. Bull.*, vol. 23, No. 7B, Dec. 1980, "Liquid Interface Optical Deflectors. . . ", pp. 3468–3471.
Suzuki et al., *Applied Optics*, vol. 15, No. 9, Sep. 1976, "Concentrated-Type Directional Coupler. . . ", pp. 2032–2033.
Watanabe et al., *Electronics Letters*, vol. 16, No. 7, Mar. 27, 1980, "1×2 Optical Switch Using New Type of Pentagonal Prism", pp. 257–259.
Mito et al., 1978 *Elect. Comm. Soc. Nat. Conference*, Paper No. 860, Mar. 1978, "Electrically Driven Rotating Mirror Type. . . ", pp. 1–4.

*Primary Examiner*—John D. Lee
*Assistant Examiner*—Frank Gonzalez
*Attorney, Agent, or Firm*—Michael J. Striker

[57] ABSTRACT

An apparatus and method for coupling and decoupling of optical radiation, in particular for laser light in optical fiber waveguides. The optical fiber waveguides are positioned in V-grooves and brought to a beam splitter. The beam splitter is adjusted by independent carriage guides and rotary guides, in order to separate a part of the radiation, which is representatively predetermined and required for control purposes.

17 Claims, 2 Drawing Figures

APPARATUS AND METHOD FOR COUPLING AND DECOUPLING OF OPTICAL FIBER WAVEGUIDES

BACKGROUND OF THE INVENTION

1. Field of the Invention

The invention relates to an apparatus and method for coupling and decoupling of optical radiation preferably as employed in communications and in connection with optical fiber waveguides.

2. Brief Description of the Background of the Invention Including Prior Art

Since the advent of optical fiber waveguides suitable for optical communication purposes there has been a desire to find suitable means for coupling and decoupling of such fiber waveguides. There is also a need for an apparatus and method for gaining information from the radiation about the properties of the radiation source and the transfer line for controlling the mode of operation of the radiation source.

In the German Offenlegungsschrift DE-OS No. 28 53 149 optical branching is disclosed employing several beam splitters, where optical fiber waveguides are connected to several optical beam splitter blocks. There is not disclosed however, how the optical fiber waveguides are directed toward the beam splitters. The light transfer qualities of such beam splitting devices depend in particular on the accurate directing of the optical fiber waveguides onto the beam splitters.

SUMMARY OF THE INVENTION

It is an object of the present invention to provide an apparatus for low loss coupling of optical fiber waveguides to beam splitters.

It is another object of the present invention to provide a beam splitter connected to optical fiber waveguides, which beam splitter is easily adjustable.

It is a further object of the present invention to provide a beamsplitter mounting which allows to couple said beam splitter easily via devices with optical imaging properties to optical fiber waveguides.

These and other objects and advantages of the present invention will become evident from the description which follows.

BRIEF DESCRIPTION OF THE INVENTION

The present invention provides an apparatus for coupling and decoupling of guided waves which comprises at least two optical fiber waveguides and a beam splitter adjustable by turning around and/or shifting along, at least two coordinates out of two independent systems of coordinates, independent from the optical fiber waveguides to be coupled or decoupled.

The beam splitter can be adjustable relative to longitudinal and angular coordinates. The beam splitter can be a prism preferably cube-shaped. The optical fiber waveguides can be directable via V-groove supports. Optical imaging devices can be connected to the beam splitter. The optical imaging device can comprise a rod lens, preferably of the type where the length of the rod lense corresponds to its focal length. The optical fiber waveguides can be glued and/or cast to the corresponding beam splitter surface. Preferably, the optical waveguides are connected to the beam splitter by way of refraction index matching optical materials. In a preferred embodiment, the beam splitter can be turned around three axes disposed about vertical relative to each other. The optical beam splitter can be disposed on a ball pan or socket.

There is also provided a method for coupling and decoupling of guided waves comprising mounting an optical fiber waveguide in a V-groove, disposing a beam splitter against the terminal of the optical fiber waveguide, mounting the terminal of a second optical waveguide, preferably in connection with a V-groove support, against the optical beam splitter and adjusting the position of the beam splitter by turning the beam splitter around at least two noncollinear axes. Preferably there is a provision for adjusting the beam splitter by rotating around three axes disposed at right angles relative to each other. The beam splitter can be an optical prism.

Beam splitting refers to a beam of light being divided into two beams by placing an optical element such as a mirror or a prism in the path of the beam that reflects part of the light falling on it and transmits part. A waveguide is a device which constrains or guides the propagation of electromagnetic waves along a path defined by the physical construction of the waveguide.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which is shown one of the various possible embodiments of the present invention

DESCRIPTION OF INVENTION AND PREFERRED EMBODIMENTS

In accordance with the present invention a beam splitter is adjustable in at least two independent coordinate directions relative to the optical fiber waveguides to be connected. It has been found that the transfer position of an optical fiber waveguide at the position of a beam splitter is dependent on other transfer locations. Such transfer positions can only be adjusted accurately by means of independent coordinate shifts tunable relative to each other.

As devices for providing coordinate shifts there can be employed carriage guides and rotary guides as they are sufficiently known in precision mechanics.

Figure 1:
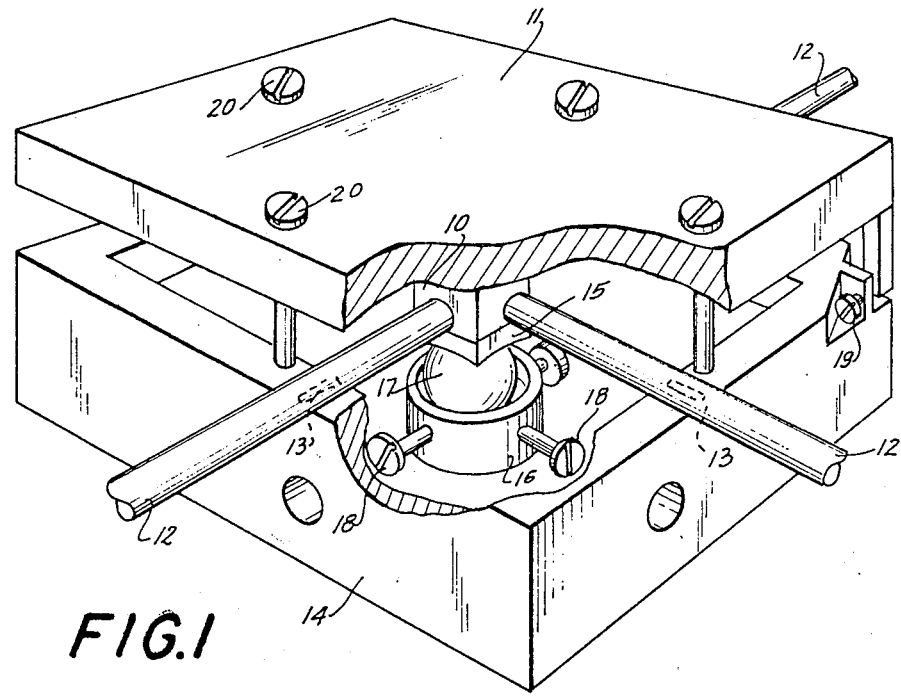
FIG. 1 is a perspective view of a block constructed for adjusting of three optical fiber waveguides relative to a beam splitter.

Referring now to FIG. 1 there is shown an adjustment block arranged in a communication line using optical radiation (not shown in detail). In order to control the power output of the radiation source, preferably of a semiconductor laser, part of the radiation passing at least one coupling point is decoupled as a control or automatic control signal.

For better recognition of the essential parts the adjustment block is shown in FIG. 1 in a perspective view with a broken out section. A beam splitter prism 10 is disposed at the center of the adjustment block. The beam splitter prism is solidly connected to the cover 11 of the adjustment block. In order to position the optical fiber waveguides 12 to the corresponding surface of the beam splitting prism 10, the waveguides are guided in V-grooves 13 formed in the base 14 of the adjustment block next to the surface of the beam splitting prism 10.

Depending on the position of the beam splitting prism 10 in the adjustment block, successive readjustments can follow for this purpose, several independent coordinate guides of the cover 11 relative to the base 14 are provided. For guiding according to angular coordinates, the beam splitting prism 10 is mounted to a ball pan 15 engaging a ball 17 which in turn is rotatably supported by a ball bearing socket 16. It is now possible to adjust the angular position of the prism by tilting the ball pan 15 with the aid of set screws 20 inserted into the cover 11 in two orthogonal planes. An additional adjustment possibility comprises rotating the cover 11 together with the beam splitter prism 10 versus the base 14 by way of a set screw 19 disposed at a corner of the adjustment block. With this additional guide recognizable behind the broken out front edge of the adjustment block the beam splitter prism 10 is adjusted in its position relative to the optical fiber waveguides 12.

Figure 2:
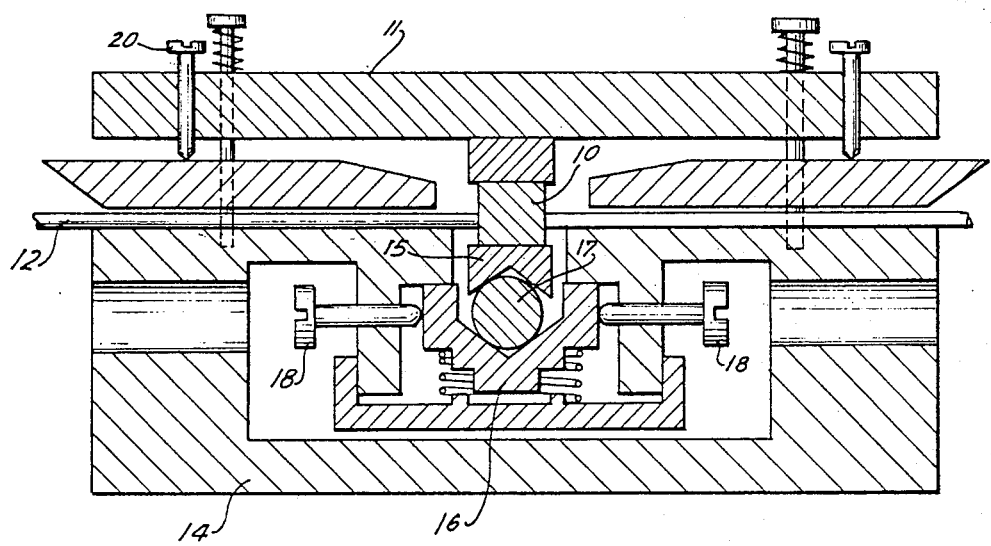
FIG. 2 is a sectional view through the block shown in FIG. 1.

There is provided an additional possibility for coordinate shifting of the adjustment block by way of the set screws 18 located in the base 14 which allow to shift the beam splitter prism 10 relative to the base 14. This translational motion allows to balance misadjustments generated upon tilting. It can further be recognized from FIG. 2, which is provided with the same reference numerals as FIG. 1, in its sectional view that the ball work pan 16 on the one hand and the cover 11 on the other hand are supported with spring mounting on the base part 14. For this purpose coil springs are employed. The coil springs for the cover support are supported by pins inserted into the base part 14. If desired the cover 11 with support means and the beam splitting prism 10 can be exchangeable with those of another beam splitting provision.

After the optical alignment of the beam splitting prism and the optical fiber waveguides, it has been found to be advantageous to glue the optical fiber waveguides 12 to the beam splitting prism 10 with a glue having a refraction index matching the optical material. This is in particular of interest in cases where it is desired to interpose between the beam splitting prism and the optical fiber waveguide additional optical devices such as for example rod lenses.

It will be understood that each of the elements described above, or two or more together, may also find a useful application in other types of system configurations and guided light wave processing apparatus differing from the type described above.

While the invention has been illustrated and described as embodied in the context of a beam splitting prism, it is not intended to be limited to the details shown, since various modifications and structural changes may be made without departing in any way from the spirit of the present invention.

Without further analysis, the foregoing will so fully reveal the gist of the present invention that others can, by employing current knownledge, readily adapt it for various applications without omitting features that, from the standpoint of prior art, fairly constitute essential characteristics of the generic or specific aspects of the invention.

What is claimed is:

1. An apparatus for coupling and decoupling of optical fiber waveguides to an optical beam splitter comprising a frame for supporting and guiding said fiber waveguides in a plane; a cover plate arranged above said frame, said beam splitter being attached to said cover plate and suspended into said plane, a universal joint arranged below said plane for supporting said beam splitter so tha the latter together with said cover plate are swingable relative to said frame; and means for fixing said waveguides and said beam splitter in an adjusted position.

2. An apparatus as defined in claim 1, comprising means for shifting the position of said universal joint parallel to said plane.

3. An apparatus as defined in claim 2, wherein said universal joint includes a base socket, a top socket and a ball between said sockets; and said shifting means including setting screws provided on said frame to engage and shift said base socket.

4. An apparatus as defined in claim 1, wherein said cover plate is elastically supported on said frame.

5. An apparatus as defined in claim 1, wherein said universal joint is elastically supported on said frame.

6. An apparatus as defined in claim 1, wherein said optical fiber waveguides are guided in V-grooves formed in said frame.

7. An apparatus as defined in claim 1, further comprising means for adjusting angular position of said cover plate relative to said frame in two orthogonal planes.

8. The apparatus according to claim 1 wherein the beam splitter is a prism.

9. The apparatus according to claim 1 wherein the beam splitter is a cube-shaped prism.

10. The apparatus according to claim 1 further comprising optical imaging device connected to the beam splitter.

11. The apparatus according to claim 10 wherein the optical imaging device comprises a rod lens.

12. The apparatus according to claim 11 wherein the length of the rod lens corresponds to its focal length.

13. A method of coupling and decoupling optical fiber waveguides to an optical beam splitter comprising the steps of supporting the beam splitter for a universal swinging motion in a plane; supporting said fiber waveguides for axial movement in said plane while maintaining contact of the ends of said waveguides with said beam splitter; adjusting the angular position of said beam splitter; and fixing the adjusted position of said beam splitter and of said fiber waveguides.

14. A method as defined in claim 13, further comprising the step of adjusting the position of said beam splitter parallel to said plane.

15. The method according to claim 13 wherein the beam splitter is an optical prism.

16. A method as defined in claim 13, wherein after the adjustment, the optical fiber waveguides are glued or fused to the corresponding beam splitter surface.

17. A method as defined in claim 16, wherein the optical fiber waveguides are glued to the beam splitter with a material matching the refraction index of the optical material.

* * * * *